US011891121B2

(12) United States Patent
Moradnia et al.

(10) Patent No.: US 11,891,121 B2
(45) Date of Patent: Feb. 6, 2024

(54) WHEEL CASING (71) Applicant: Honda Motor Co., Ltd., Tokyo (JP)

(72) Inventors: Pirooz Moradnia, Dublin, OH (US);
Matthew L. Metka, Plain City, OH (US); Pratap Thamanna Rao, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 205 days.

(21) Appl. No.: 17/374,301

(22) Filed: Jul. 13, 2021

(65) Prior Publication Data

US 2023/0013812 A1 Jan. 19, 2023

(51) Int. Cl.
*B60T 5/00* (2006.01)
*B62D 25/16* (2006.01)
*B62D 25/18* (2006.01)
*B62D 35/02* (2006.01)

(52) U.S. Cl.
CPC .............. *B62D 25/18* (2013.01); *B60T 5/00* (2013.01); *B62D 25/163* (2013.01); *B62D 35/02* (2013.01)

(58) Field of Classification Search
CPC .... B62D 25/18; B62D 25/163; B62D 25/186; B62D 35/02; B62D 35/00; B60T 5/00; F16D 65/847
See application file for complete search history.

(56) References Cited

U.S. PATENT DOCUMENTS

| 1,613,443 | A | * | 1/1927 | Amato | B62D 25/186 |
| | | | | | 280/157 |
| 4,317,508 | A | * | 3/1982 | Katagiri | F16D 55/22 |
| | | | | | 188/71.6 |
| 5,820,203 | A | * | 10/1998 | Morelli | B62D 35/02 |
| | | | | | 296/180.1 |
| 5,836,399 | A | | 11/1998 | Maiwald et al. | |

(Continued)

FOREIGN PATENT DOCUMENTS

CN 105774445 B 3/2019
CN 107031738 B 6/2019
(Continued)

OTHER PUBLICATIONS

Moe, Christian, 2015 Chevrolet Chaparral 2X VGT Concept, Nov. 20, 2014 [online], [retrieved on Aug. 24, 2021]. Retrieved from the Internet <URL: https://www.topspeed.com/cars/chevrolet/2015-chevrolet-chaparral-2x-vgt-concept-ar166232.html>.

*Primary Examiner* — Steve Clemmons
(74) *Attorney, Agent, or Firm* — Plumsea Law Group, LLC (57) ABSTRACT A wheel casing for a vehicle having a wheel assembly including a wheel and a tire. The wheel casing includes a body portion positionable adjacent an inboard surface of the tire, and a brake cooling duct defining an air inlet opening and an air outlet opening. The air outlet opening is in fluid communication with a brake system component and the air inlet opening is positionable inboard of the body portion when the body portion is positioned adjacent the inboard (Continued)

surface of the tire, thereby providing cooling air flow through the brake cooling duct to the brake system component when the vehicle is in forward motion. The wheel casing further includes a suspension arm undercover extending inboard of the body portion and configured to protect predetermined components of the vehicle.

20 Claims, 12 Drawing Sheets

(56) References Cited

U.S. PATENT DOCUMENTS

| | | | |
|---|---|---|---|
| 5,951,123 A * | 9/1999 | Bomstad | E02D 3/026 |
| | | | 172/112 |
| 6,007,102 A | 12/1999 | Helmus | |
| 6,886,862 B2 * | 5/2005 | Matthew | B62D 25/168 |
| | | | 280/847 |
| 8,424,956 B2 | 4/2013 | Stimel | |
| 8,746,782 B2 * | 6/2014 | Naoi | B62D 25/24 |
| | | | 296/180.1 |
| 8,882,121 B2 * | 11/2014 | Ducroquet | B62D 25/168 |
| | | | 280/157 |
| 8,979,102 B1 | 3/2015 | Prentice | |
| 9,227,475 B2 * | 1/2016 | Ottinger | B62D 29/004 |
| 9,327,550 B2 | 5/2016 | Butler et al. | |
| 9,694,857 B2 | 7/2017 | Rudwal et al. | |
| 9,926,021 B2 * | 3/2018 | Han | B62D 35/02 |
| 10,494,033 B2 | 12/2019 | Haeseker et al. | |
| 10,654,532 B2 * | 5/2020 | Nakamura | B62D 35/02 |
| 10,787,205 B2 * | 9/2020 | Driant | B62D 25/16 |
| 11,059,528 B2 * | 7/2021 | Nakamura | B62D 35/005 |
| 11,072,313 B2 * | 7/2021 | Schuemann | B62D 35/02 |
| 2011/0080019 A1 * | 4/2011 | Castillo | B62D 25/16 |
| | | | 296/180.1 |
| 2011/0304129 A1 | 12/2011 | Owens | |
| 2012/0013113 A1 | 1/2012 | Trenne et al. | |
| 2013/0096781 A1 | 4/2013 | Reichenbach et al. | |
| 2017/0299066 A1 * | 10/2017 | Shi | F16K 1/427 |
| 2018/0257716 A1 | 9/2018 | Haeseker et al. | |
| 2019/0270486 A1 | 9/2019 | Del Gaizo et al. | |
| 2019/0300069 A1 | 10/2019 | Angelo | |
| 2020/0114681 A1 | 4/2020 | Parry-Williams et al. | |

FOREIGN PATENT DOCUMENTS

| | | | | |
|---|---|---|---|---|
| CN | 209336470 U | 9/2019 | | |
| CN | 209956082 U | 1/2020 | | |
| CN | 211519673 U | 9/2020 | | |
| DE | 102004044514 A1 * | 3/2006 | | F16D 65/847 |
| DE | 102011056319 A1 * | 6/2013 | | B60T 5/00 |
| DE | 102013223668 A1 * | 5/2015 | | B60T 5/00 |
| DE | 102016209085 A1 | 11/2017 | | |
| DE | 102018205793 A1 * | 10/2019 | | B60B 27/0052 |
| EP | 3405383 A1 | 11/2018 | | |
| FR | 2987804 B1 | 6/2015 | | |
| FR | 3044591 B1 | 10/2018 | | |
| GB | 191010752 A * | 3/1911 | | |
| GB | 191422562 A * | 10/1915 | | |
| RU | 2139806 C1 | 10/1999 | | |
| WO | 201624054 A1 | 2/2016 | | |

* cited by examiner

WHEEL CASING

BACKGROUND

The present disclosure relates to a wheel casing for a vehicle tire and, more particularly, to a wheel casing for reduced aerodynamic drag and/or increased brake cooling performance.

When a vehicle is in motion, the passage of the vehicle through the air causes aerodynamic drag. The wheel well or wheel opening of a vehicle is one source of drag force on the vehicle due to the open space defined between the vehicle wheel and the wheel well. That is, air flow within the wheel well contributes to vehicle drag.

Wheel liners and wheel casings have been used to reduce the amount of space between the vehicle wheel and the wheel well and thereby reduce the volume of air flowing within the wheel well that contributes to vehicle drag. However, conventional wheel casings have been applied to an exterior side of the vehicle and thus detract from the overall aesthetic appearance of the vehicle. Moreover, conventional wheel casings are formed from a substantially solid material which inhibits the flow of air over the brake calipers and rotors.

SUMMARY

There is a need in the art for a wheel casing system that improves the aerodynamic performance and the brake cooling performance of a vehicle without detracting from the outer appearance of the wheel assembly.

The wheel casings according to the exemplary embodiments of the disclosure herein serve to reduce the amount of air flowing around the wheel assembly, thereby reducing the amount of drag caused by the rotating tires and improving the aerodynamic performance of the vehicle. In addition, the wheel casings are provided with a brake cooling window that allows cooling air flow to the brake calipers and/or rotors or other vehicle components. Further, the wheel casings may be accompanied by a suspension arm undercover to further reduce the contact of underbody air flow with the suspension components and to further limit air flow entrance into wheelhouse.

In one aspect, the disclosure provides a wheel casing for a vehicle having a wheel assembly including a wheel and a tire. The wheel casing includes a body portion positionable adjacent an inboard surface of the tire, and a brake cooling duct defining an air inlet opening and an air outlet opening. The air outlet opening is in fluid communication with a brake system component and the air inlet opening is positionable inboard of the body portion when the body portion is positioned adjacent the inboard surface of the tire, thereby providing cooling air flow through the brake cooling duct to the brake system component when the vehicle is in forward motion.

Another aspect of the disclosure provides a wheel casing for a vehicle having a wheel assembly including a wheel and a tire. The wheel casing includes a first portion configured to cover only a portion of a front circumferential surface of the tire, the first portion having a curvature generally corresponding to a curvature of the front circumferential surface of the tire; and a second portion configured to cover only a portion of an inboard surface of the tire, the portion of the inboard surface of the tire being defined on only a lower half of the tire. The second portion further includes a brake cooling window configured to provide cooling air flow therethrough to a brake system component when the vehicle is in motion.

According to a further aspect of the disclosure, a vehicle includes a wheel assembly having an inboard surface and an outboard surface, the wheel assembly including a wheel configured for rotation with respect to the vehicle and a tire disposed on the wheel, a wheel casing mounted for protecting the wheel, the wheel casing having an inboard portion configured to cover a portion of the inboard surface of the wheel assembly, and a suspension arm undercover positioned inboard from the inboard portion.

In another aspect of the disclosure, an aerodynamic automotive vehicle apparatus for a wheel assembly includes an inboard portion configured to cover a portion of an inboard surface of the wheel assembly, and a suspension arm undercover disposed inboard of the inboard portion, the suspension arm undercover configured to be movable relative to the inboard portion between a first normal position, a second raised position, and a third lowered position.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

A wheel casing assembly according to exemplary embodiments of the disclosure are configured to reduce the aerodynamic drag on the vehicle and thus improve the vehicle's performance, as discussed in greater detail below. In one exemplary embodiment, the wheel casing assembly includes a brake cooling window or brake cooling duct to improve the brake cooling performance of the wheel casing. A further exemplary embodiment of the disclosure includes a suspension arm undercover providing protection to the underbody vehicle suspension components.

FIGS. 1-7 illustrate an exemplary embodiment of the wheel casing 12 in great detail while the remaining figures have been simplified and many structural details have been omitted merely for clarity. Within the scope of the disclosure herein, the wheel casing 12 can be formed with or without some or all of such details and should not be limited to any particular illustrated construction detail.

Figure 1:
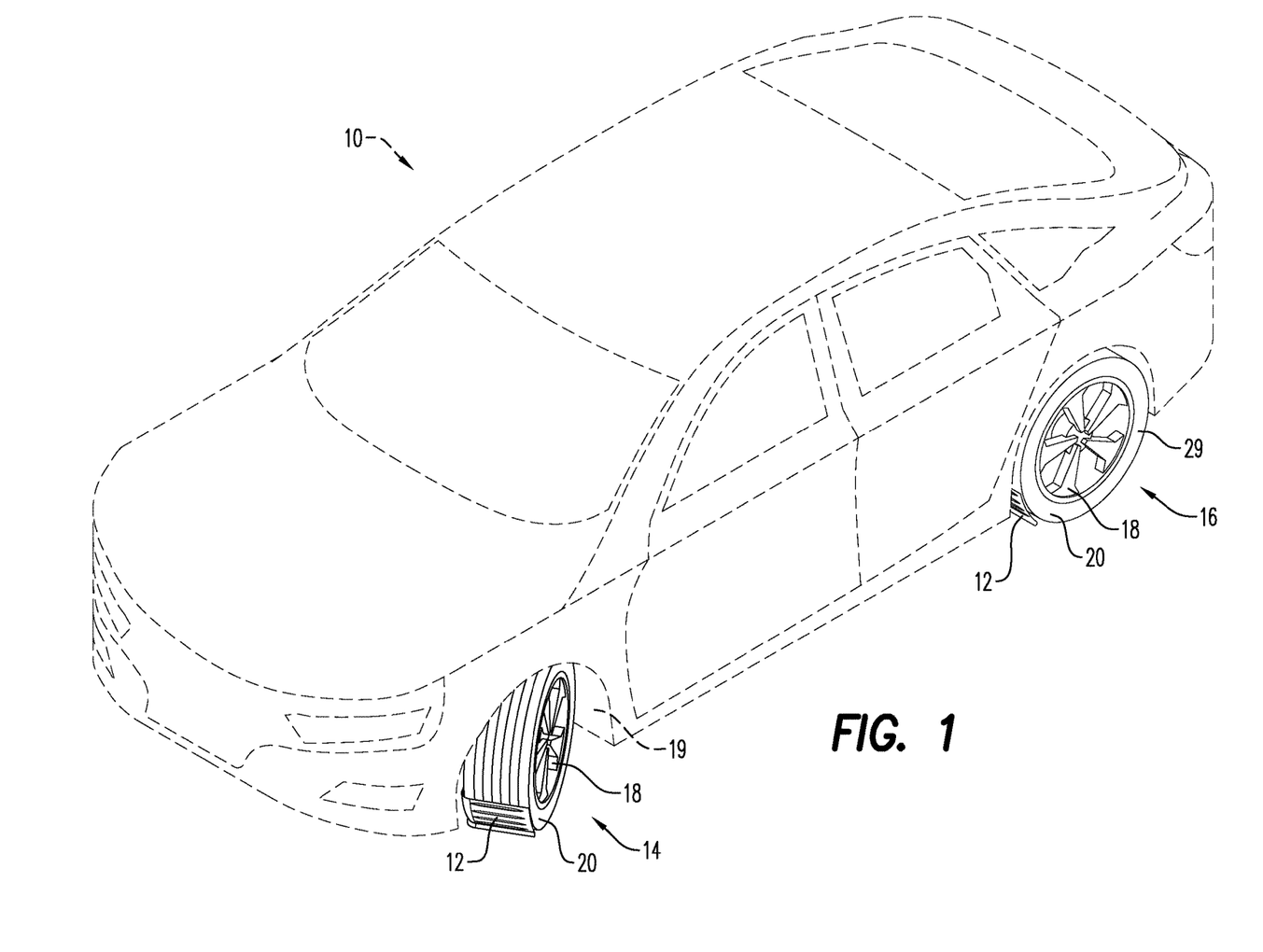
FIG. 1 is a perspective view of a vehicle with the wheel casings according to a first exemplary embodiment of the disclosure.
Figure 2:
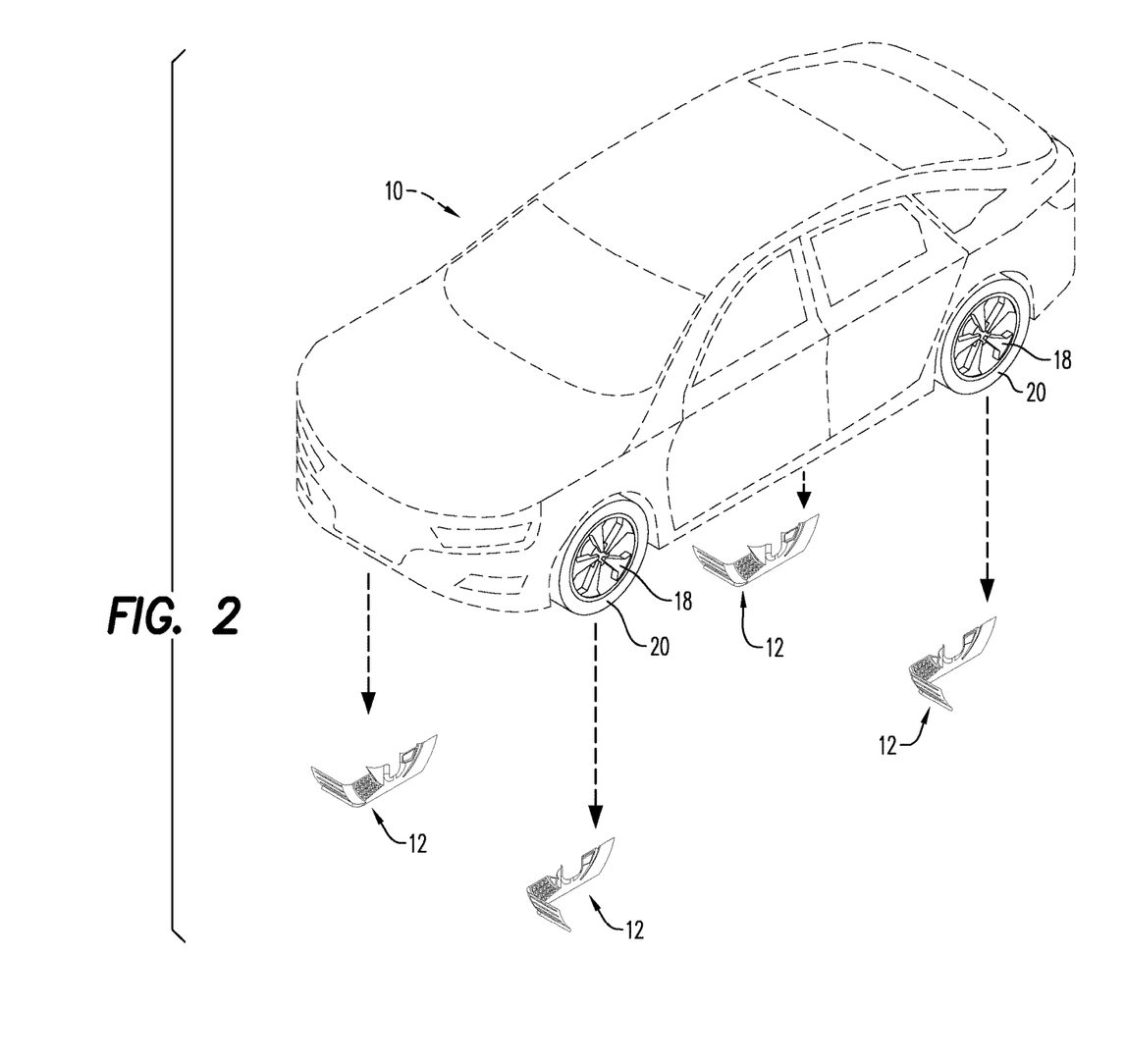
FIG. 2 is an exploded view of the vehicle and wheel casings shown in FIG. 1.
Figures 3, 4:
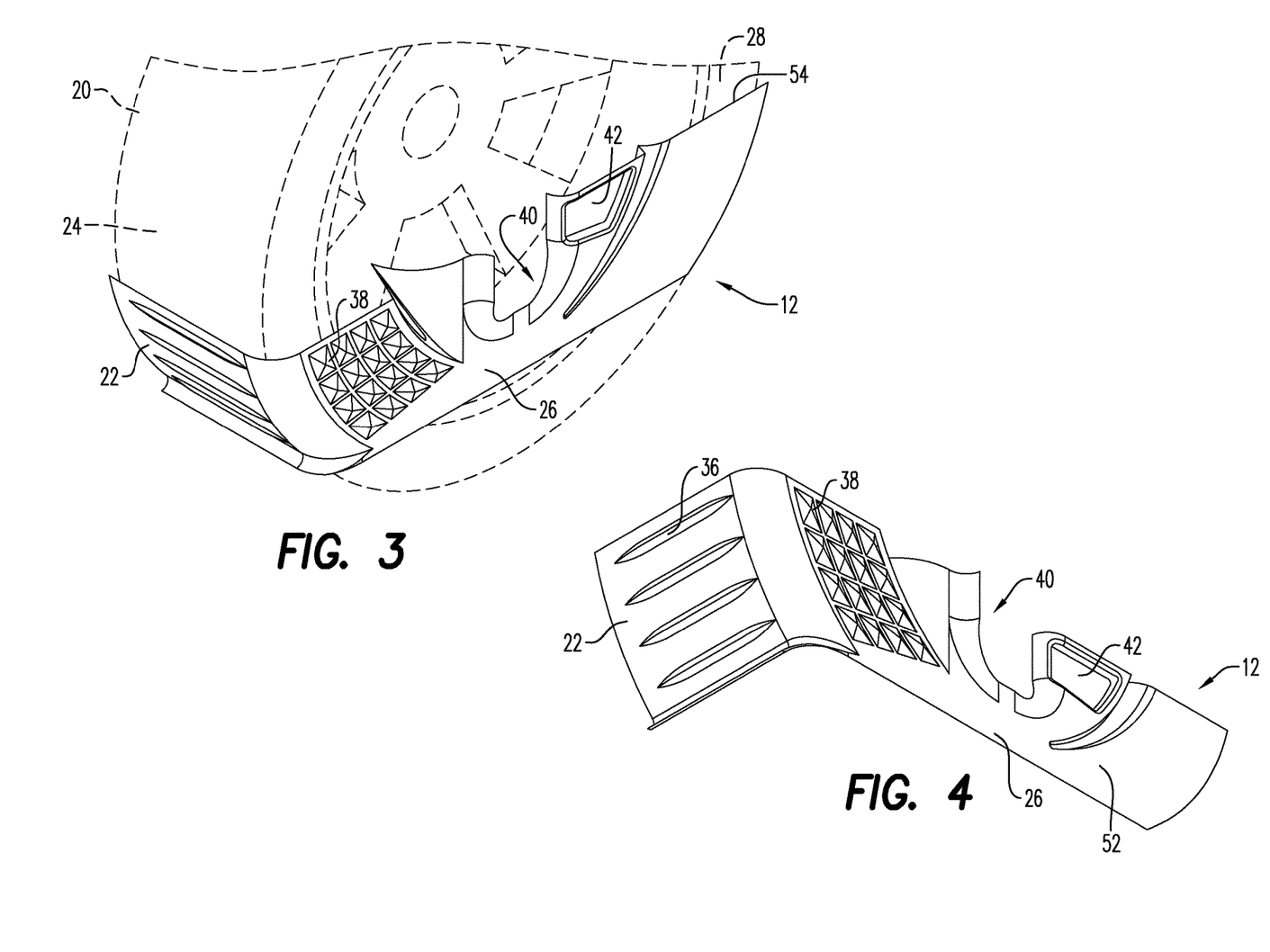
FIG. 3 is an outer, front, top perspective view of a wheel casing for a wheel according to the first exemplary embodiment of the disclosure showing a brake cooling window.
FIG. 4 is an outer, front, bottom perspective view of the wheel casing shown in FIG. 3.
Figure 5:
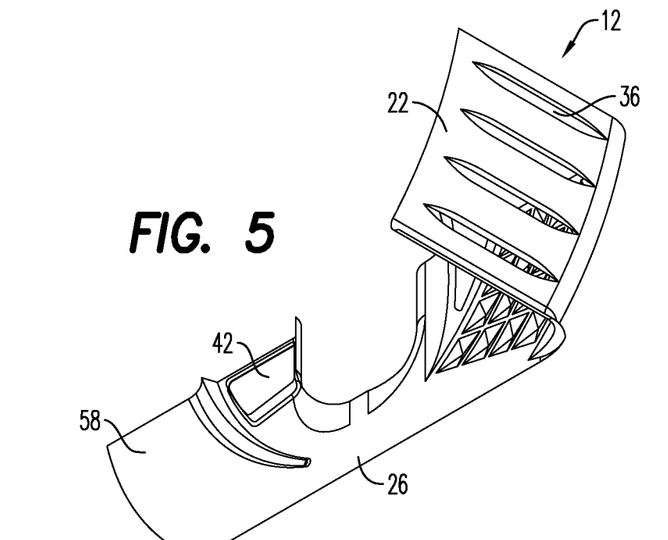
FIG. 5 is an inner, front, bottom perspective view of the wheel casing shown in FIG. 3.
Figure 6:
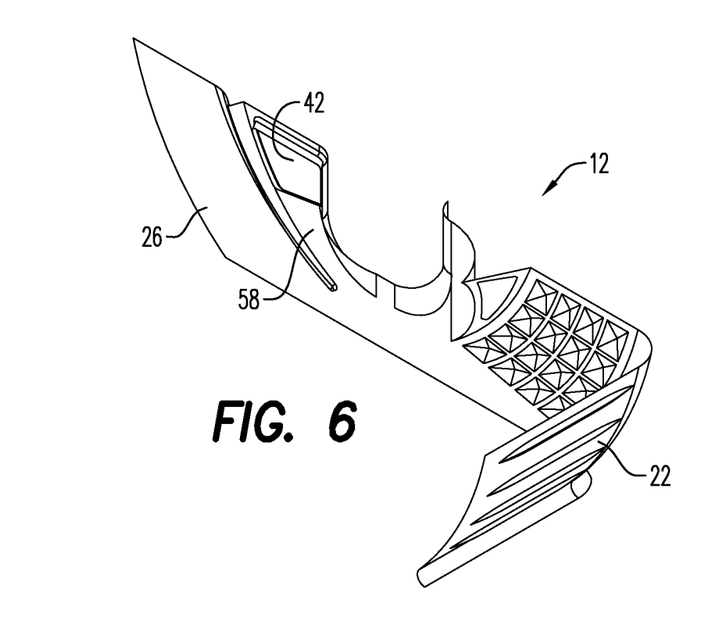
FIG. 6 is an inner, front, top perspective view of the wheel casing shown in FIG. 3.
Figure 7:
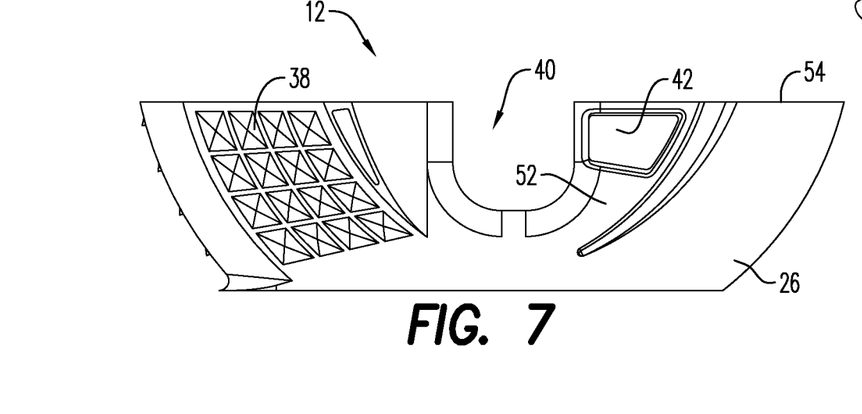
FIG. 7 is a front view of the wheel casing shown in FIG. 3.

More particularly, a vehicle having reduced aerodynamic drag in accordance with an exemplary embodiment of the disclosure herein is shown generally by reference numeral 10 in FIGS. 1 and 2. In particular, the vehicle 10 includes wheel casings 12 configured for reducing aerodynamic drag across a wheel assembly 14, 16 of the vehicle 10, as set forth in more detail below. The wheel casings 12 also serve to shield the tires 20 from high momentum air flow underneath the vehicle when the vehicle is in motion and from excess air within the wheel housing 19. The vehicle 10 and wheel casings 12 can be used in automotive applications to improve aerodynamic performance and provide improved vehicle fuel/power economy, without detracting from the visual appearance of the vehicle. As will be appreciated by one skilled in the art, the wheel casings 12 may also be useful for non-automotive applications.

Vehicle 10 includes a pair of front wheel assemblies 14 and a pair of rear wheel assemblies 16 disposed, respectively, on front and rear axles (not shown) of the vehicle 10. Each wheel assembly 14, 16 is configured for moving the vehicle 10 across a surface, such as a road. That is, the wheel assembly 14 includes a wheel 18 configured for rotation with respect to the vehicle 10 and a rotatable tire 20 disposed on the wheel 18. In operation, the axles are turned by a driveshaft (not shown) which in turn rotates the wheels 18 of the vehicle 10. The wheel 18 may be a front wheel disposed on a front axle (not shown) of the vehicle 10 and forming part of a front wheel assembly 14. The wheel 18 could also be a rear wheel disposed on a rear axle (not shown) of the vehicle 10 and forming part of a rear wheel assembly 16. The wheel casings 12 according to an exemplary embodiment of the disclosure herein may be used for reducing aerodynamic drag across front wheel assemblies 14 and rear wheel assemblies 16, as shown in FIG. 2.

FIGS. 3-6 illustrate an exemplary embodiment of the wheel casing 12 as viewed from an inner side or inboard sidewall 28 of the tire 20, i.e., when looking at the wheel casing 12 from a centerline axis underneath the vehicle, rather than from an outer side or outboard sidewall 29 of the tire 20. As shown, the wheel casing 12 includes an inboard body portion 26 positionable along the inboard side 28 of the tire 20 and an integrated front portion or strake 22 configured to cover only a portion of the front circumferential surface 24 of the tire 20. The body portion 26 defines a tire wall protection face which in the exemplary embodiment herein covers a lower portion (i.e., below the centerline) of the inboard surface 28 of the tire 20. The wheel casing 12 is positioned such that an upper edge 54 of the body portion 26 is disposed approximately at or lower than a horizontal centerline of the tire 20 and the wheel casing 12 covers more than half of the lower portion of the inboard side 28 of the tire 20. In other words, the casing 12 is positioned below the axis of rotation of the tire 20 when the body portion 26 is positioned along the inboard side 28 of the tire 20. The body portion 26 may of course be configured to cover more or less of the tire 20 as may be necessitated by a particular vehicle design and is not limited to only the lower portion of the tire 20. The front strake 22 also includes at least one drainage vent or opening 36 which assists with ventilation around the tire 20 and in the drainage of rainwater and other substances, such as sand, small rocks, gravel, snow and the like, away from the vehicle 10. Body portion 26 may also include a plurality of drainage and ventilation openings 38 to assist with the drainage of rain water, sand and other substances from the wheel assembly 14, 16. This is useful to prevent the same from scratching the tires 20 and to allow excess air within the wheel well or wheel housing 19 to be vented away from the wheel assembly 14, 16 to avoid pressure buildup. The body portion 26 of the wheel casing 12 further includes an axle opening 40 to accommodate movement of the wheel axle (not shown), either forward or rearward, depending upon the location of the casing 12.

The wheel casings 12 can be mounted in a multitude of ways including, by way of non-limiting example, attachment to the wheel knuckle 78 or as an extension of brake shields (not shown) of the vehicle 10. The attachment locations are not limited to those mentioned above, and any mechanisms of attachment could be used if it successfully places the wheel casings in the proper location for use. An exemplary embodiment of the wheel casing 12 further includes at least one brake cooling window 42, which is shown disposed rearward of the axle opening 40 in the non-limiting exemplary embodiment; however, the position of the brake cooling window 42 may vary depending upon the location of other brake components. The brake cooling window 42 is formed as a through-opening in the wheel casing material, extending from the inboard side 52 of the body portion 26 of the wheel casing 12 through to the outboard side 58 of the wheel casing 12 which faces the tire 20. Thus, when the wheel casing 12 is mounted as intended, the brake cooling window 42 is properly positioned to provide cooling air flow through the wheel casing 12 to the brake calipers (not shown) or rotors (not shown) when the vehicle 10 is in motion. Although the brake cooling window 42 is shown with a quadrilateral shape, the quantity, location, shape and size of the brake cooling window 42 may of course vary as required to meet the brake cooling needs of a particular vehicle.

Figures 8A, 8B, 8C:
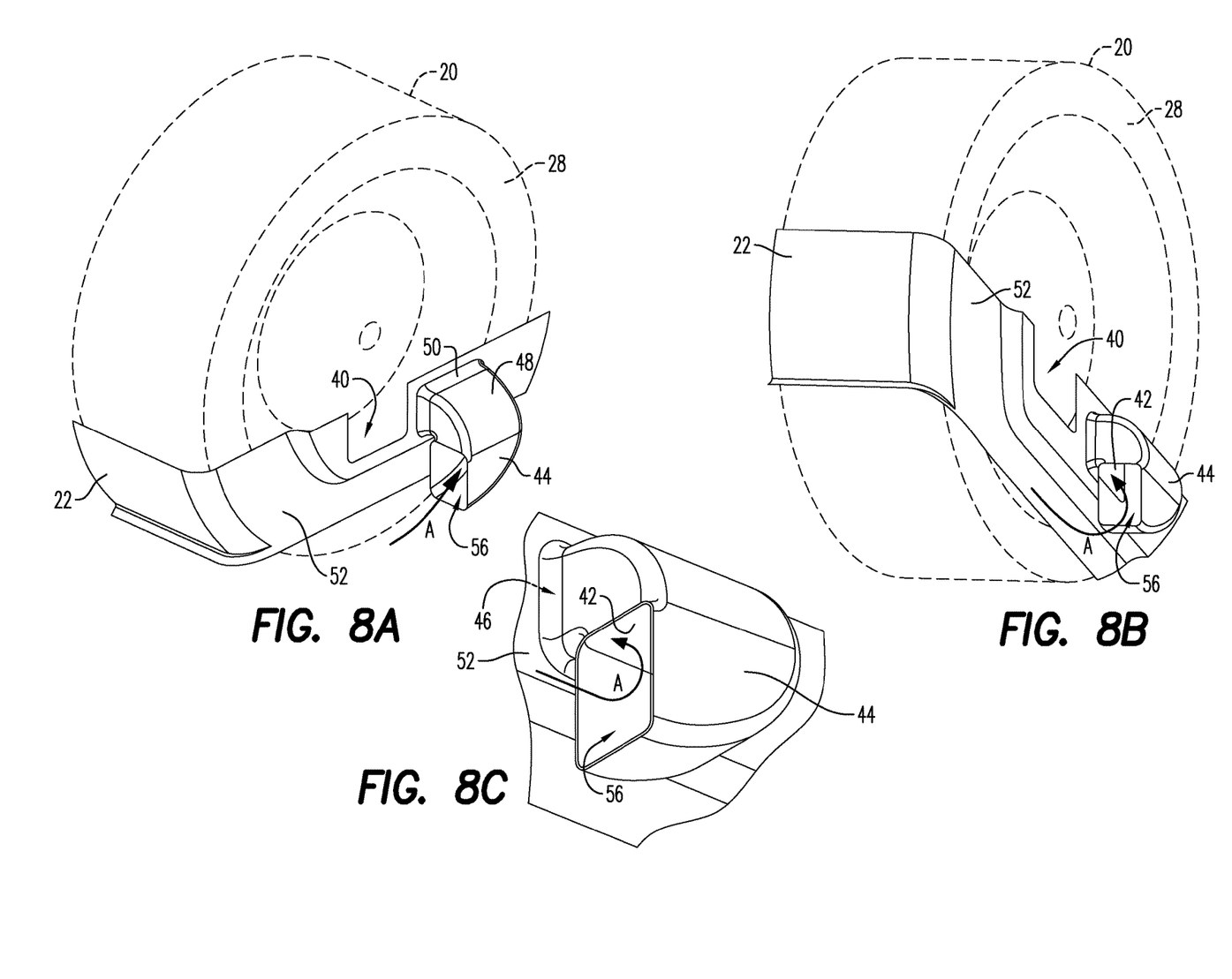
FIG. 8A is an inner, front, top perspective view of a wheel casing for a wheel according to a further exemplary embodiment of the disclosure showing a cooling duct over the brake cooling window.
FIG. 8B is an inner, front, bottom perspective view of the wheel casing shown in FIG. 8A.
FIG. 8C is an enlarged view of the cooling duct shown in FIG. 8B.

For certain brake cooling performance needs, however, the brake cooling window 42 may not be sufficient to provide the volume of air that is required to adequately cool certain brakes. In this instance, according to a further exemplary embodiment of the disclosure shown in FIGS. 8A-8C, a brake cooling duct 44 is provided to increase the air flow over the brakes and rotors of the vehicle 10. The brake cooling duct 44 includes an upper hood portion 48 having a rearward edge 50 defining an air outlet opening 46 generally corresponding to the shape of the brake cooling window 42 and in communication therewith. The rearward edge 50 is secured to the inboard side 52 of the body portion 26 of the wheel casing 12. That is, the brake cooling duct 44 extends inwards from the casing 12 towards the centerline of the vehicle 10. The brake cooling duct 44 has an air inlet opening 56 facing towards the front of the vehicle 10. Hence, when the vehicle 10 is in forward motion, oncoming airflow A will enter the air inlet opening 56, travel through the brake cooling duct hood portion 48 and exit by way of the air outlet opening 46 defined by the rearward edge 50 through the brake cooling window 42. The brake cooling duct 44 thus scoops the oncoming cooling air A passing into the air inlet opening 56 and guides the airflow to exit outwards through an air outlet opening 46 and the brake cooling window 42. As such, the brake cooling duct 44 allows for scooping of an increased volume of air which in turns provides increased brake cooling performance. However, it should be noted that the brake cooling window is not always required when a cooling duct is provided, such as, by way of non-limited example, a cooling duct scenario may have the air outlet opening arranged directly opposite the brake component without a cooling window being provided in the wheel casing.

Figures 9A, 9B:
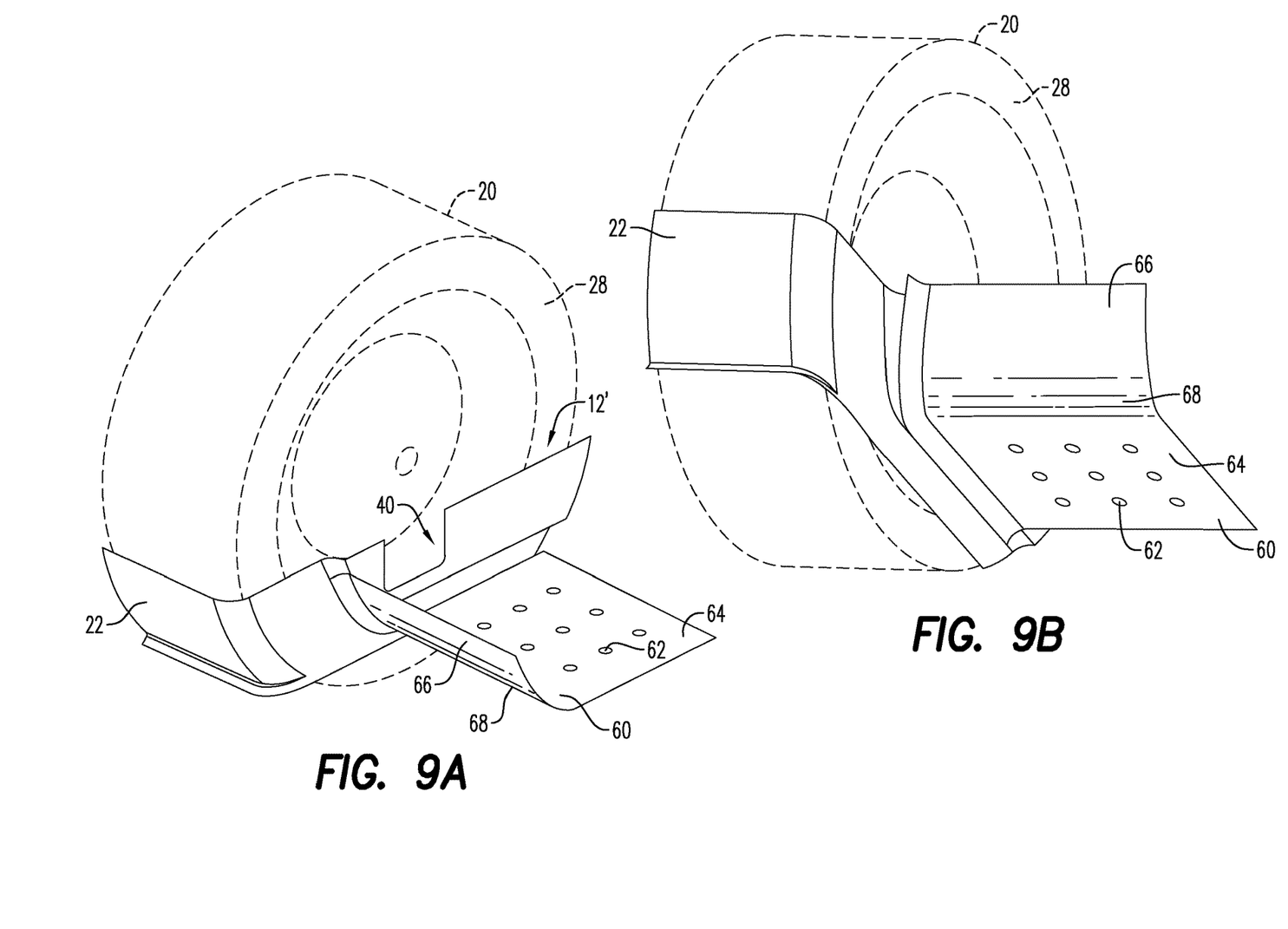
FIG. 9A is an inner, front, top perspective view of a wheel casing for a wheel according to a second exemplary embodiment of the disclosure showing a suspension arm undercover.
FIG. 9B is an inner, front, bottom perspective view of the wheel casing shown in FIG. 9A.
Figure 16:
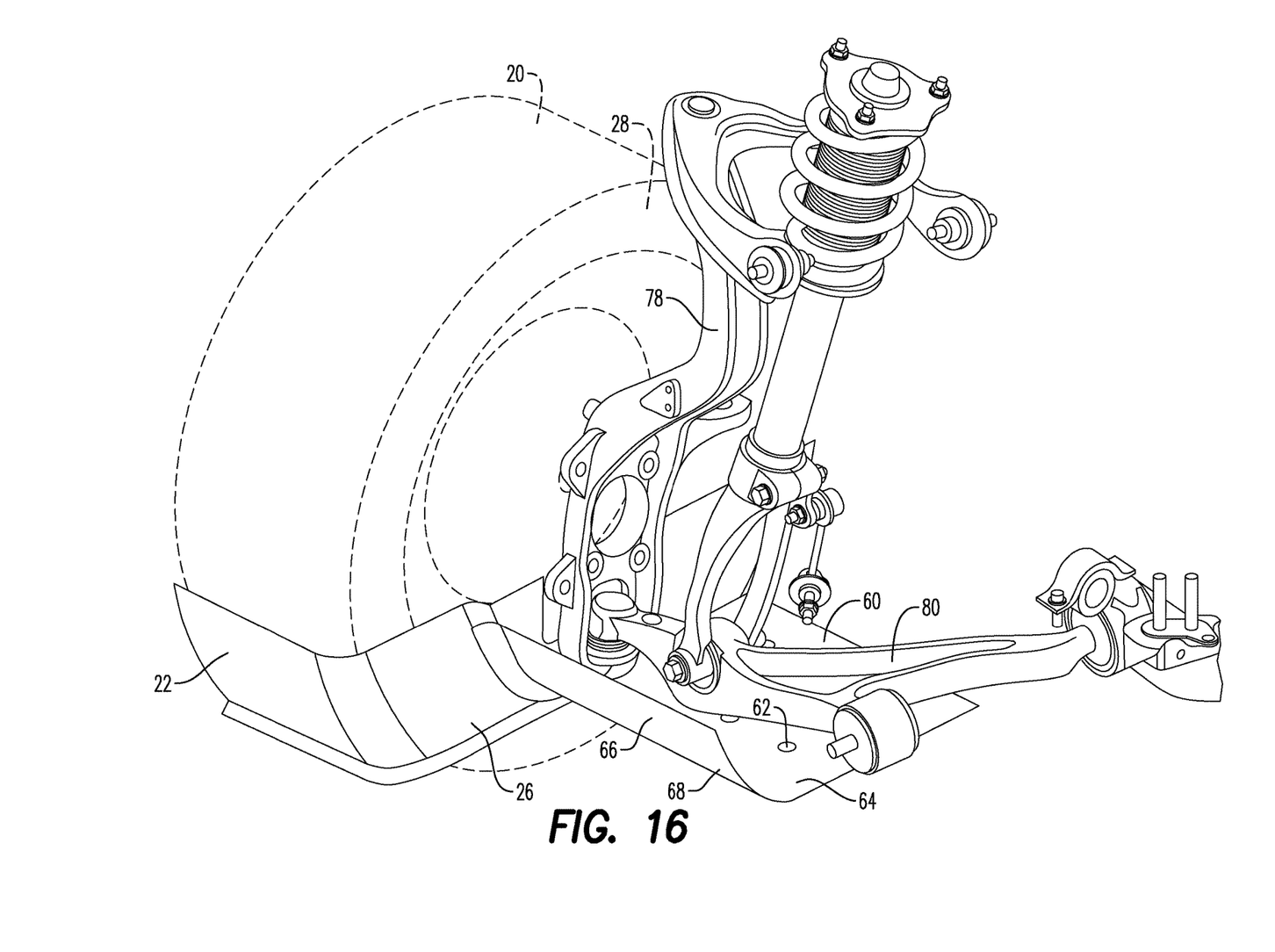
FIG. 16 is a further perspective view of a wheel casing according to an exemplary embodiment of the disclosure together with suspension components of the vehicle.

Referring to FIG. 9A-9B, a second embodiment of a wheel casing according to an exemplary embodiment of the disclosure is shown generally by reference numeral 12'. Wheel casing 12' includes an integrated suspension arm undercover 60 configured to cover and protect certain underbody components of the vehicle such as a lower arm 80 (see FIG. 16), a steering linkage and/or control arm forming part of the vehicle's steering or suspension assembly. The integrated suspension arm undercover 60 includes a first or lower surface facing downwards towards the road and forward of the vehicle, and a second or upper surface facing upwards and away from the road surface. In the exemplary embodiment, the undercover 60 is provided with one or more openings 62 which assist in the drainage of rainwater and other substances, such as snow, gravel, mud and the like, away from the vehicle 10. The quantity, dimensions and arrangement of the openings 62 is not limiting and may vary greatly depending upon the requirements of the vehicle. The cover 60 includes a lower portion 64 and an upper portion 66 disposed at an angle relative to the lower portion 64. As shown best in FIG. 9A, the lower portion 64 extends generally horizontal such that the lower surface faces downwards parallel with the road surface. The lower portion 64 includes at least a majority of the perforations or openings 62. The upper portion 66 is integrally joined with the lower portion 64 and extends upwardly from the lower portion 64 at a forward edge 68 having a radius of approximately 15-50 mm (and thereby defines an angle of approximately 30-90 degrees relative to the lower portion 64), although other radius of curvatures could be used depending upon the particular design parameters of the vehicle. The upper portion 66 extends generally vertical and serves to reduce the contact of the airflow A with the suspension components of the vehicle 10 as well as limit the air flow entering the wheelhouse around the tire 20. The undercover 60 is also effective in reducing component wear resulting from rock chipping, rusting from road salt, and similar deterioration.

Figure 10:
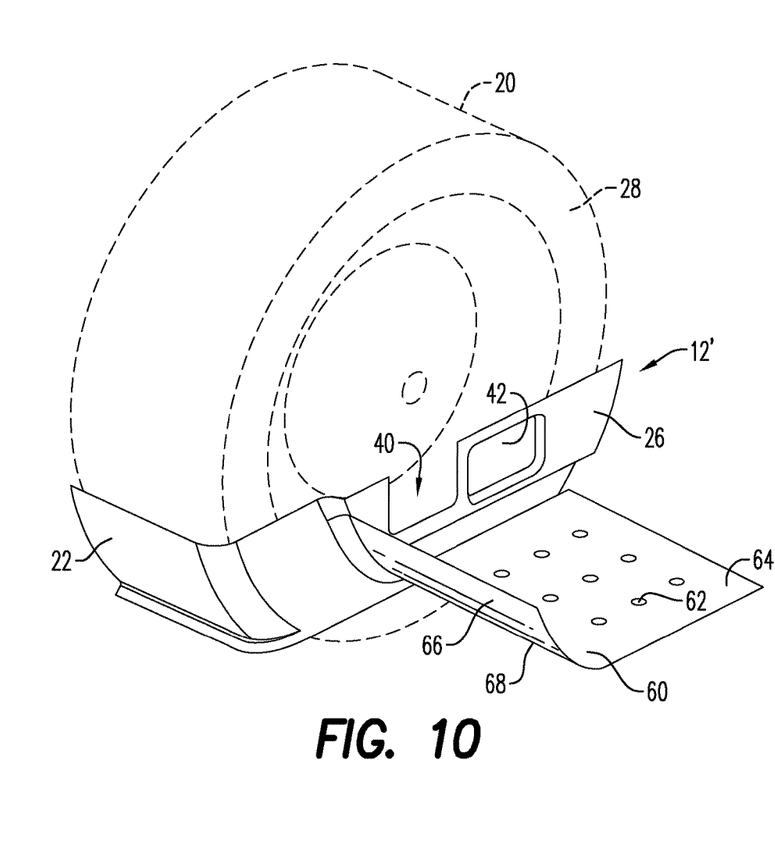
FIG. 10 is an inner, front, top perspective view of a wheel casing for a wheel according to a third exemplary embodiment of the disclosure showing a suspension arm undercover and a brake cooling window.

A further exemplary embodiment of the wheel casing 12', as shown in FIG. 10, also includes at least one brake cooling window 42 disposed rearward of the axle opening 40. The brake cooling window 42 is formed as a through-opening in the wheel casing material, and as discussed above extends from the inboard side 52 of the body portion 26 of the wheel casing 12 through to the outboard side 58 of the wheel casing 12 which faces the tire 20. Thus, when the wheel casing 12' is mounted as intended, the brake cooling window 42 is properly positioned to provide cooling air flow through the wheel casing 12' to the brake calipers (not shown) or rotors (not shown) when the vehicle 10 is in forward motion. Although the brake cooling window 42 is shown with a quadrilateral shape, the quantity, position, shape and size of the brake cooling window 42 may of course vary as required to meet the brake cooling needs of a particular vehicle.

Figure 11A:
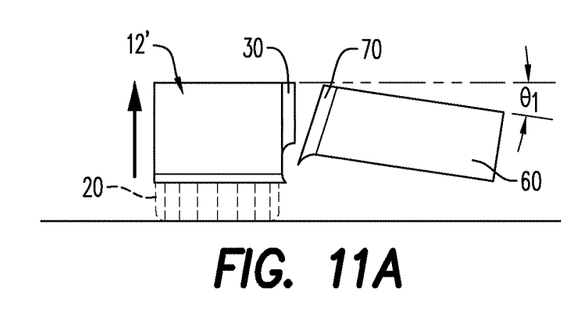
FIGS. 11A-11C illustrate relative positions of the wheel casing and the suspension arm undercover in varying driving situations.
Figure 11B:
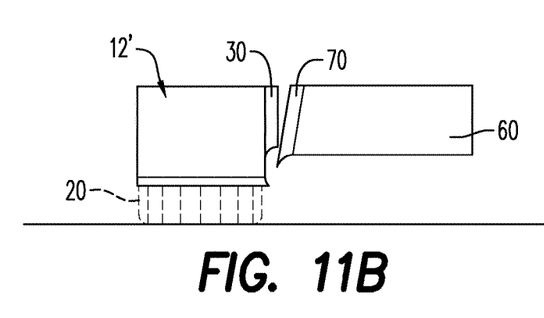
Figure 11C:
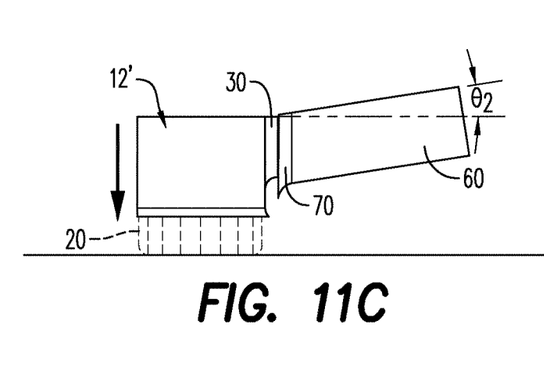

With reference to FIGS. 11A-11C, the wheel casing 12' and the suspension arm undercover 60 are configured to be mounted on different components (i.e., the wheel hub vs. suspension arm). The suspension arm undercover 60 may have a lip 70 extending outwardly and downward to inhibit the underbody air from impacting the wheel casing 12' and penetrating into the gap between the suspension arm undercover 60 and the wheel casing 12'. Similarly, the wheel casing 12' may have a deflector face 30 protruding outward (toward the centerline of the vehicle) to further limit the flow of air in the gap between the wheel casing 12' and the suspension arm undercover 60. The normal relative position of the wheel casing 12' and the undercover 60 is shown in FIG. 11B. However, the wheel casing 12' and the suspension arm can assume different angles in relation to each other. As a result, as shown in FIG. 11A, if the tire 20 is raised or bumped up relative to the suspension arm such as when driving over a road bump, an angle $\theta_1$ is defined by the relatively lower suspension arm undercover 60. Conversely, as shown in FIG. 11C, if the tire 20 is bumped down relative to the suspension arm such as when the vehicle is raised, an angle $\theta_2$ is defined by the higher suspension arm undercover 60. The outboard edge of the suspension arm undercover 60 may be slanted to accommodate for this relative movement, as seen by the sloping edge of lip 70.

Figures 12A, 12B:
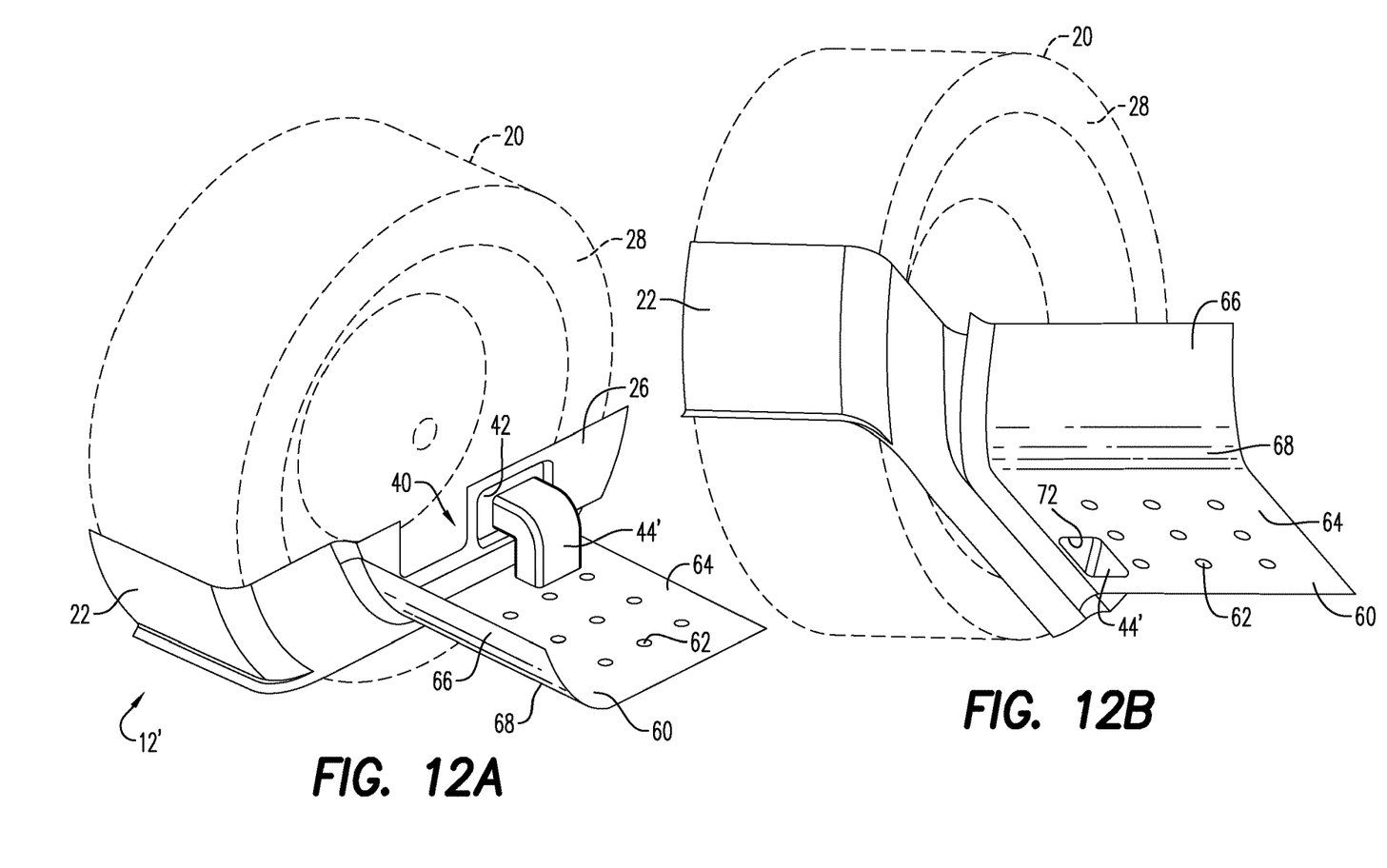
FIG. 12A is an inner, front, top perspective view of a wheel casing for a wheel according to a fourth exemplary embodiment of the disclosure showing a suspension arm undercover and a cooling duct over the brake cooling window.
FIG. 12B is an inner, front, bottom perspective view of the wheel casing shown in FIG. 12A.

For certain brake cooling performance needs, the brake cooling window 42 shown in FIG. 10 may not be sufficient to provide the volume of air that is required to adequately cool certain brakes. In this instance, according to a further exemplary embodiment of the disclosure shown in FIGS. 12A-12B, a brake cooling duct 44' is attached to the suspension arm undercover 60. The brake cooling duct 44' outlet is provided in the brake cooling window 42 to increase the air flow over the brakes and rotors of the vehicle 10. The brake cooling window 42 is larger than the brake cooling duct 44', however, to accommodate relative motion between the wheel casing 12' and the undercover 60. As best shown in FIG. 12B, the underside of the undercover 60 includes an opening 72 defining an air inlet opening which allows air to flow into the brake cooling duct 44'. Hence, when the vehicle 10 is in forward motion, oncoming airflow will enter the air inlet opening 72, travel through the brake cooling duct 44' and exit by way of the brake cooling window 42. The brake cooling duct 44' thus funnels the oncoming cooling air passing into the air inlet opening 72 and guides the airflow to exit outwards through the brake cooling window 42. As such, the brake cooling duct 44' allows for an increased volume of air which in turns provides increased brake cooling performance.

Figure 13A:
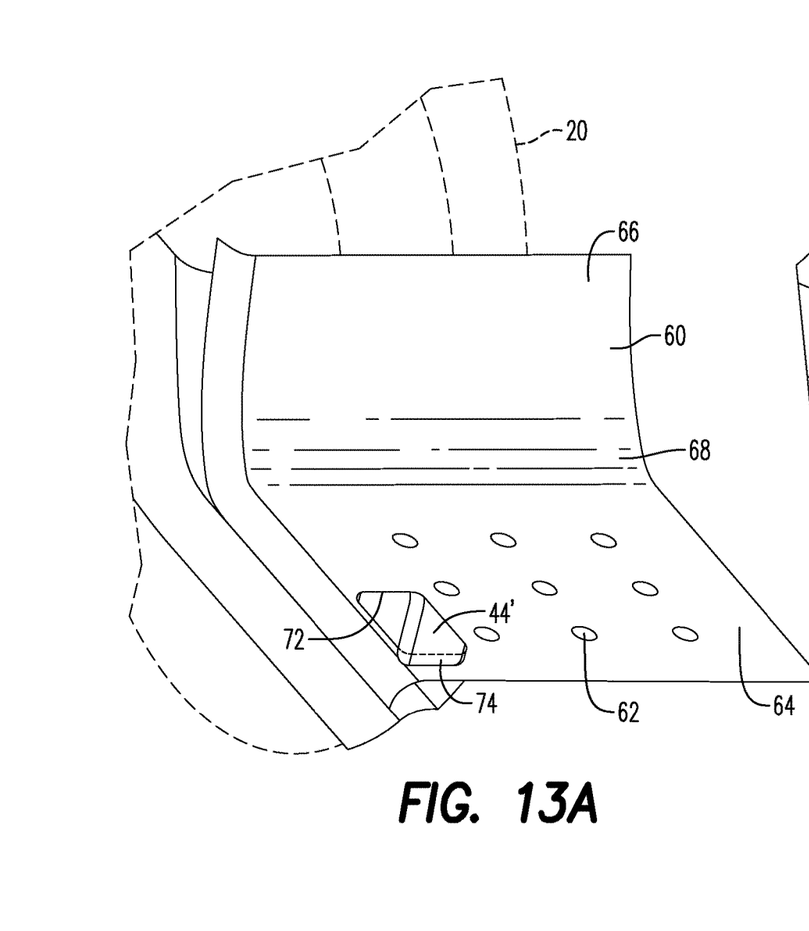
FIG. 13A is a bottom perspective view of the suspension arm undercover according to a further exemplary embodiment including an inlet scoop to the cooling duct.
Figure 13B:
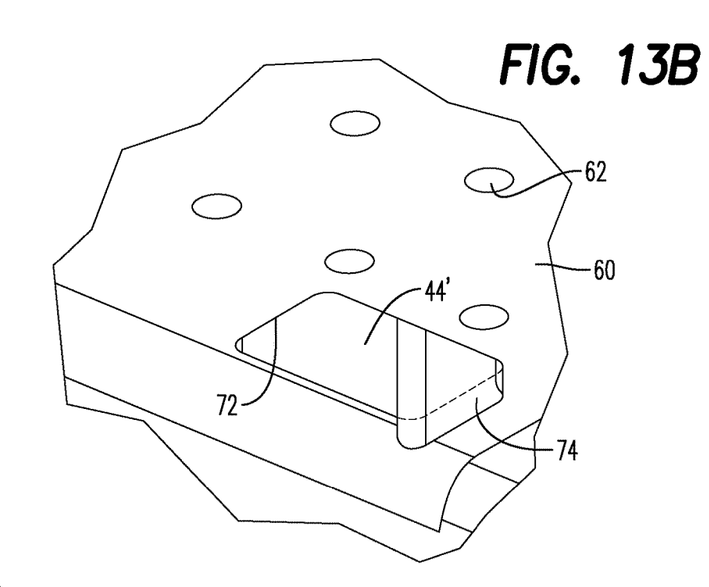
FIG. 13B is an enlarged view of the inlet scoop shown in FIG. 13A.
Figure 13C:
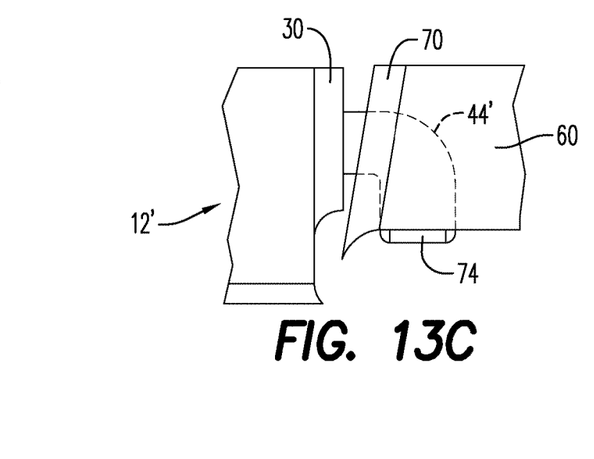
FIG. 13C is a side view of the wheel casing for a wheel having a suspension arm undercover, cooling duct and the inlet scoop.

Still, to further facilitate extracting cooling air flow into the brake cooling duct 44', an inlet scoop 74 may be added to the downstream side of the brake cooling duct inlet 72, as shown in FIGS. 13A-13C. The addition of the inlet scoop 74 assists in increasing the volume of air flow into the brake cooling duct 44' by extending slightly below the lower surface of the suspension arm undercover 60.

Figures 14A, 14B:
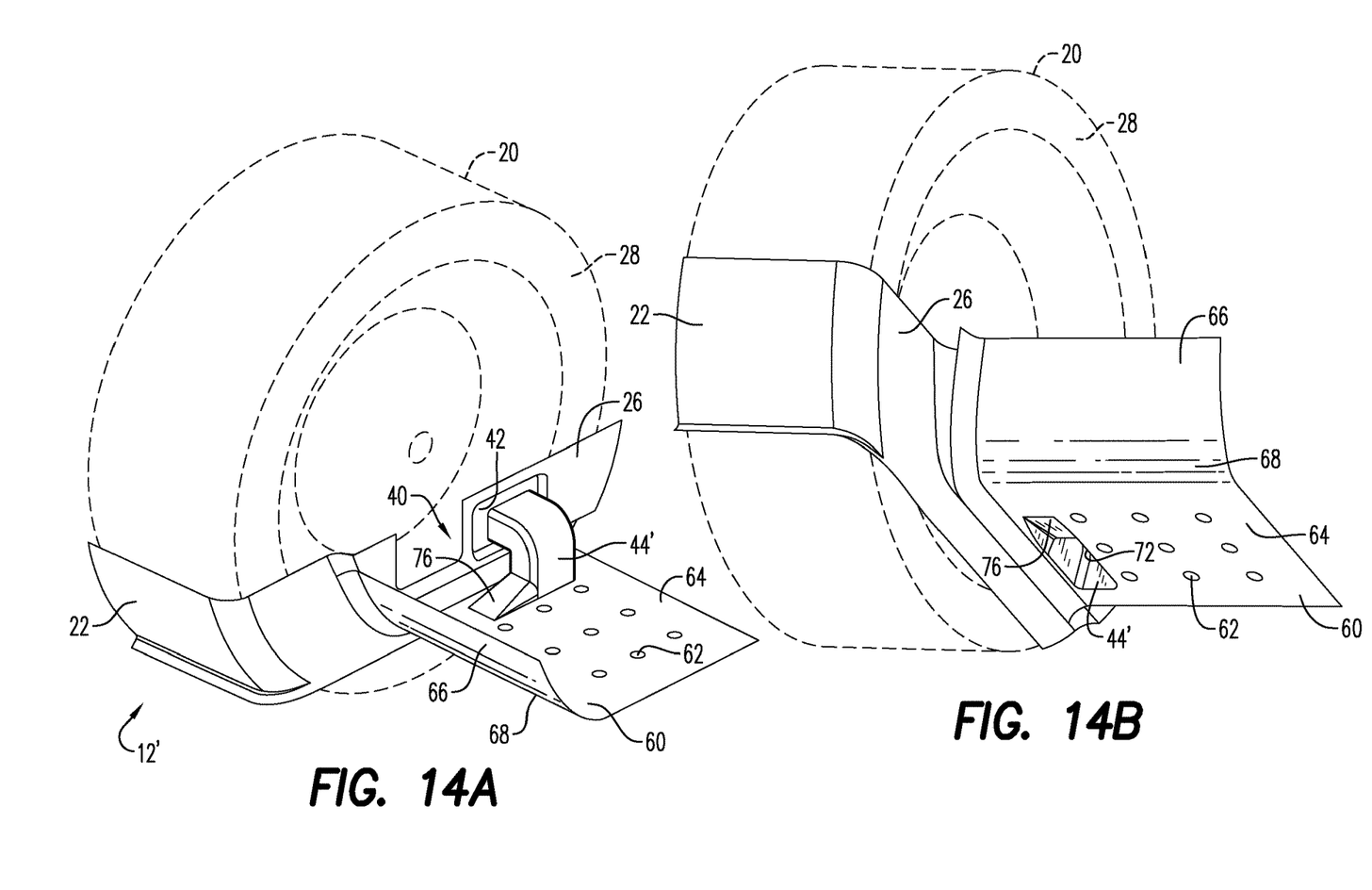
FIG. 14A is an inner, front, top perspective view of a wheel casing for a wheel according to a fifth exemplary embodiment of the disclosure showing a suspension arm undercover, a cooling duct over the brake cooling window, and an inlet ramp.
FIG. 14B is an inner, front, bottom perspective view of the wheel casing shown in FIG. 14A.

A further modification of the wheel casing 12' includes an inlet ramp 76 provided on the upstream side of the brake cooling duct 44', as shown in FIGS. 14A-14B. As best shown on the bottom view of FIG. 14B, the inlet ramp 76 provides a gradual inlet to further facilitate extracting cooling air flow into the brake cooling duct 44'.

Figure 15A:
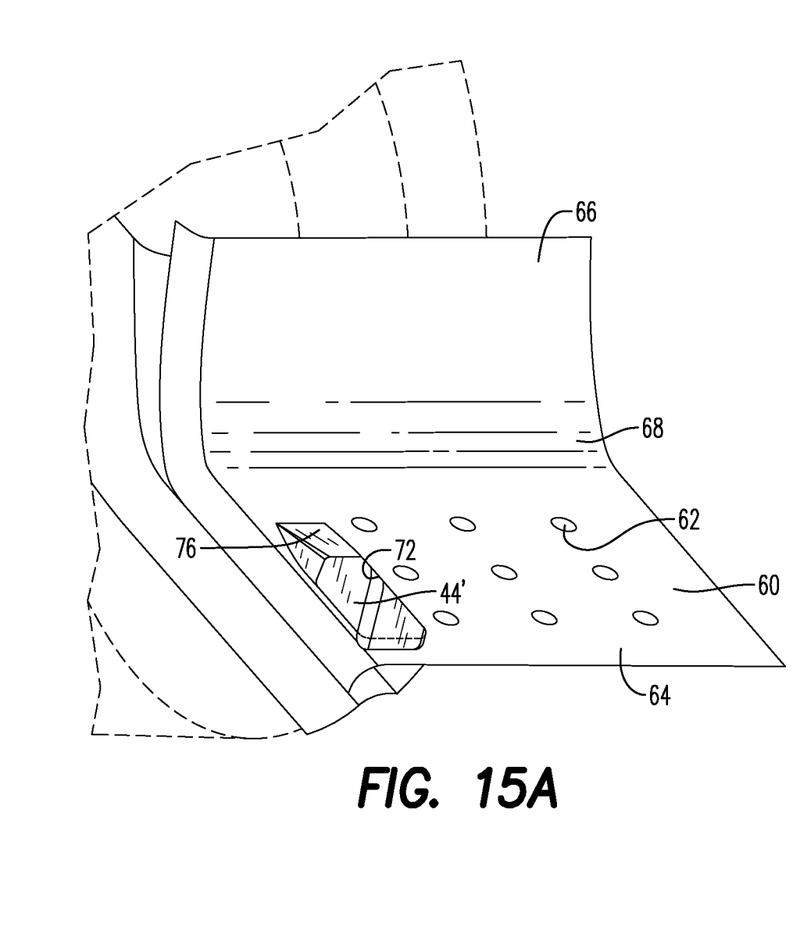
FIG. 15A is in enlarged inner, front, bottom perspective view of a wheel casing for a wheel according to a further exemplary embodiment of the disclosure showing a suspension arm undercover with an inlet ramp and a scoop.
Figure 15B:
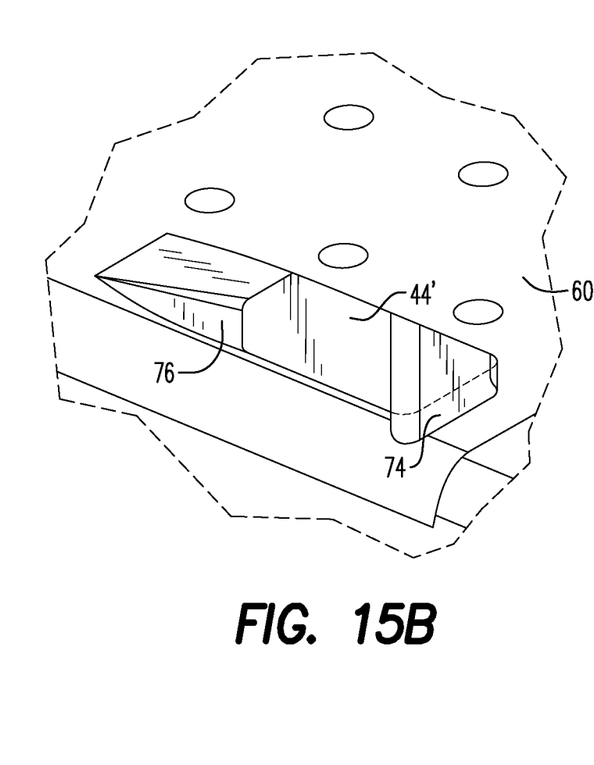
FIG. 15B is an enlarged view of the inlet ramp and scoop shown in FIG. 15A.

Still further, the individual elements discussed above can be combined to provide additionally increased air flow. As shown in FIGS. 15A-15B, the suspension arm undercover 60 includes both an inlet ramp 76 and an inlet scoop 74 for further increasing the cooling air volume or mass air flow rate into the brake cooling duct 44'.

Hence, the wheel casing 12 according to the exemplary embodiment provides a brake cooling window 42 alone or in combination with a brake cooling duct 44 which guides air to the wheel assembly 16 in order to cool the brakes when the vehicle is in motion. A further exemplary embodiment of the disclosure provides a wheel casing 12' having a suspension arm undercover 60 to further reduce the contact of underbody air flow with suspension components. The undercover 60 further limits the air flow entrance into wheelhouses and reduces component wear resulted from rocks. The wheel casing 12' may further include at least one brake cooling window 42 disposed rearward of the axle opening 40 to provide cooling air flow through the wheel casing 12' to the brake calipers or rotors or other components when the vehicle 10 is in motion. The cooling performance of the wheel casing 12' is further enhanced by the addition of a cooling brake duct 44', which may or may not include an inlet scoop 74 and/or inlet ramp 76 to maximize the volume of cooling air being scooped into the cooling duct.

The disclosure herein is directed to a number of wheel casing configurations and implementations. One skilled in the art will recognize that each of the configurations can be implemented individually and/or in combination with other features of the disclosure.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A wheel casing for a vehicle having a wheel assembly including a wheel and a tire, the wheel casing comprising:
   a body portion positionable adjacent an inboard surface of the tire; and
   a brake cooling duct defining a closed air passageway having an air inlet opening on one end of the brake cooling duct and an air outlet opening on an opposing end of the brake cooling duct;
   wherein the air inlet opening is disposed substantially vertically aligned below the air outlet opening; and
   wherein the air outlet opening is in fluid communication with a brake system component and the air inlet opening is positionable inboard of the body portion when the body portion is positioned adjacent the inboard surface of the tire, thereby providing cooling air flow through the brake cooling duct to the brake system component when the vehicle is in forward motion.

2. The wheel casing according to claim 1, wherein the air inlet opening is configured to face towards a front end of the vehicle, whereby, when the vehicle is in forward motion, oncoming airflow enters the air inlet opening and exits through the air outlet opening.

3. The wheel casing according to claim 1, further comprising a suspension arm undercover extending inboard of the body portion and configured to protect predetermined components of the vehicle.

4. The wheel casing according to claim 3, wherein the suspension arm undercover includes a plurality of drainage openings.

5. The wheel casing according to claim 3, wherein the brake cooling duct extends from the suspension arm undercover.

6. The wheel casing according to claim 5, wherein the suspension arm undercover includes a lower portion and an upper portion extending therefrom, the lower portion including the air inlet opening for the brake cooling duct.

7. The wheel casing according to claim 6, wherein the air inlet opening is disposed rearward of the upper portion of the suspension arm undercover.

8. The wheel casing according to claim 3, wherein the body portion includes a brake cooling window, the brake cooling window and the air outlet opening being in fluid communication to provide cooling air flow therethrough, and the brake cooling window and the air outlet opening being configured to accommodate relative motion between the wheel casing and the suspension arm undercover.

9. The wheel casing according to claim 3, wherein the body portion includes a brake cooling window configured to be disposed rearward of an axis of rotation of the tire.

10. The wheel casing according to claim 9, wherein the air inlet opening for the brake cooling duct is disposed lower than the air outlet opening for the brake cooling duct.

11. The wheel casing according to claim 9, wherein a portion of the brake cooling duct defining the air outlet opening is secured to a portion of the body portion defining the brake cooling window.

12. A vehicle comprising:
- a wheel assembly having an inboard surface and an outboard surface, the wheel assembly including a wheel configured for rotation with respect to the vehicle about an axis of rotation and a tire disposed on the wheel;
- a wheel casing mounted for protecting the wheel, the wheel casing comprising a body portion configured to cover a portion of the inboard surface of the wheel assembly, the body portion including a continuous length positioned beneath the axis of rotation, along the inboard surface of the tire, and extending between a first end disposed on one side of the axis of rotation to a second free terminal end disposed on an opposing side of the axis of rotation; and
- a suspension arm undercover extending entirely inboard from the body portion.

13. The vehicle according to claim 12, wherein the suspension arm undercover includes a plurality of drainage openings.

14. The vehicle according to claim 12, wherein the inboard portion of the wheel casing includes a brake cooling window.

15. The vehicle according to claim 14, wherein the suspension arm undercover includes a brake cooling duct having an air inlet opening and an air outlet opening.

16. The vehicle according to claim 12, wherein the suspension arm undercover includes a lower portion and an upper portion, the upper portion extending from a forward edge of the lower portion.

17. The vehicle according to claim 16, wherein the wheel casing includes a front strake having a lowermost surface, the lower portion of the suspension arm undercover being disposed higher than the lowermost surface of the front strake relative to the inboard surface of the wheel assembly.

18. An aerodynamic automotive vehicle apparatus for a wheel assembly including a wheel and a suspension system, the apparatus comprising:
- a wheel casing having an inboard portion configured to cover a portion of an inboard surface of the wheel assembly, the inboard portion being disposed beneath an axis of rotation of the wheel; and
- a suspension arm undercover disposed inboard of the inboard portion, the suspension arm undercover configured to be movable relative to the inboard portion between a first normal position, a second raised position, and a third lowered position.

19. The apparatus according to claim 18, wherein the suspension arm undercover is configured to be positioned spaced apart from the inboard portion when the suspension arm undercover is in the first normal position and to thereby define a gap therebetween, the suspension arm undercover further including a lip configured to be positioned adjacent the gap so as to direct underbody air flow away from the gap.

20. The apparatus according to claim 18, wherein the inboard portion includes a brake cooling window formed as a through-opening therein, and further comprising a brake cooling duct defining a closed air passageway having an air inlet opening and an air outlet opening, the air inlet opening being disposed substantially vertically aligned below the air outlet opening, and the air outlet opening being in fluid communication with the brake cooling window when the suspension arm undercover is disposed in the first normal position.

* * * * *